United States Patent
Krause et al.

(10) Patent No.: US 9,451,197 B1
(45) Date of Patent: Sep. 20, 2016

(54) CLOUD-BASED SYSTEM USING VIDEO COMPRESSION FOR INTERACTIVE APPLICATIONS

(75) Inventors: Edward A Krause, Saratoga, CA (US); Peter A Monta, Palo Alto, CA (US)

(73) Assignee: UV Networks, Inc., Cupertino, CA (US)

( * ) Notice: Subject to any disclaimer, the term of this patent is extended or adjusted under 35 U.S.C. 154(b) by 27 days.

(21) Appl. No.: 13/441,822

(22) Filed: Apr. 6, 2012

Related U.S. Application Data

(63) Continuation-in-part of application No. 13/085,468, filed on Apr. 12, 2011.

(60) Provisional application No. 61/472,615, filed on Apr. 6, 2011, provisional application No. 61/323,316, filed on Apr. 12, 2010.

(51) Int. Cl.
*H04N 21/422* (2011.01)
*H04N 5/445* (2011.01)

(52) U.S. Cl.
CPC ...... *H04N 5/44591* (2013.01); *H04N 21/4221* (2013.01)

(58) Field of Classification Search
None
See application file for complete search history.

(56) References Cited

U.S. PATENT DOCUMENTS

| | | | |
|---|---|---|---|
| 8,856,827 B1 | 10/2014 | Krause et al. | |
| 2002/0120942 A1* | 8/2002 | Avison | 725/135 |
| 2003/0146940 A1* | 8/2003 | Ellis | H04H 60/31 715/811 |
| 2005/0204382 A1* | 9/2005 | Ellis | 725/35 |
| 2006/0059513 A1* | 3/2006 | Tang | H04N 5/44591 725/37 |
| 2007/0032720 A1 | 2/2007 | Koivukangas et al. | |
| 2007/0229496 A1 | 10/2007 | Adams | |
| 2008/0211825 A1 | 9/2008 | Sunakawa et al. | |
| 2009/0225828 A1 | 9/2009 | Perlman et al. | |
| 2010/0050077 A1 | 2/2010 | Ryman | |
| 2011/0134120 A1 | 6/2011 | Antonyuk et al. | |

* cited by examiner

*Primary Examiner* — Cai Chen
(74) *Attorney, Agent, or Firm* — Patents and Licensing LLC; Daniel W. Juffernbruch

(57) ABSTRACT

A server interactively serves client applications and client applications make estimates until updates are received from the server based on user input from the client. Processors on both the server and client execute applications with images. A video encoder in the server estimates images in response to the client user input and forwards a compressed data stream to the client. A video decoder of the client obtains images from memory and estimates images and reconstructs images from a compressed data stream in synchronization with an encoder of the server using the user input. A client display displays a region from memory of the one or more estimated images.

18 Claims, 15 Drawing Sheets

CLOUD-BASED SYSTEM USING VIDEO COMPRESSION FOR INTERACTIVE APPLICATIONS

CROSS-REFERENCE TO RELATED APPLICATIONS

This application claims priority benefits under 35 U.S.C. §§119(e) and/or 120 to U.S. provisional application No. 61/472,615 filed on Apr. 6, 2011 and U.S. application Ser. No. 13/085,468 filed on Apr. 12, 2011 which claimed priority to U.S. provisional application No. 61/323,316 filed on Apr. 12, 2010 and U.S. provisional application No. 61/472,615 filed on Apr. 6, 2011. All such prior applications are incorporated herein by reference as if set forth in full herein.

BACKGROUND OF THE INVENTIONS

1. Technical Field

The present inventions relate to server assisted applications on clients and, more particularly, relate to encoders and decoders for applications on clients and servers.

2. Description of the Related Art

Vast libraries of video content can be accessed by browsing to internet sites such as YouTube or Hulu, or alternatively, the latest information or live events may be broadcast from other internet sites specializing in real-time streaming. However, once video content is selected, the viewing experience has remained relatively unchanged. Whether the video is rendered to a sub-window of a web browser or other media playback tool, or displayed fullscreen on a computer or dedicated television display, very little interactivity is permitted between the streaming source and the client receiver and display device. Typically, interactive requests are usually limited to the well-known VCR trick modes such as pause, fast-forward, fast-reverse, and slow motion. Alternatively, the user may interject a request to access a different portion of the same program or to switch to a different program altogether. This can be contrasted with the more interactive applications such as web browsing. Such applications are optimized for use with user input devices such as a touch screen, touch pad, or the traditional desktop mouse and keyboard. For example, means for optimizing and customizing the presentation of content are often embedded in the content itself, and may take the form of Javascript executable software. In response to user input, the client application will automatically request and download additional information if needed by forwarding requests to various internet servers.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Figure 1:
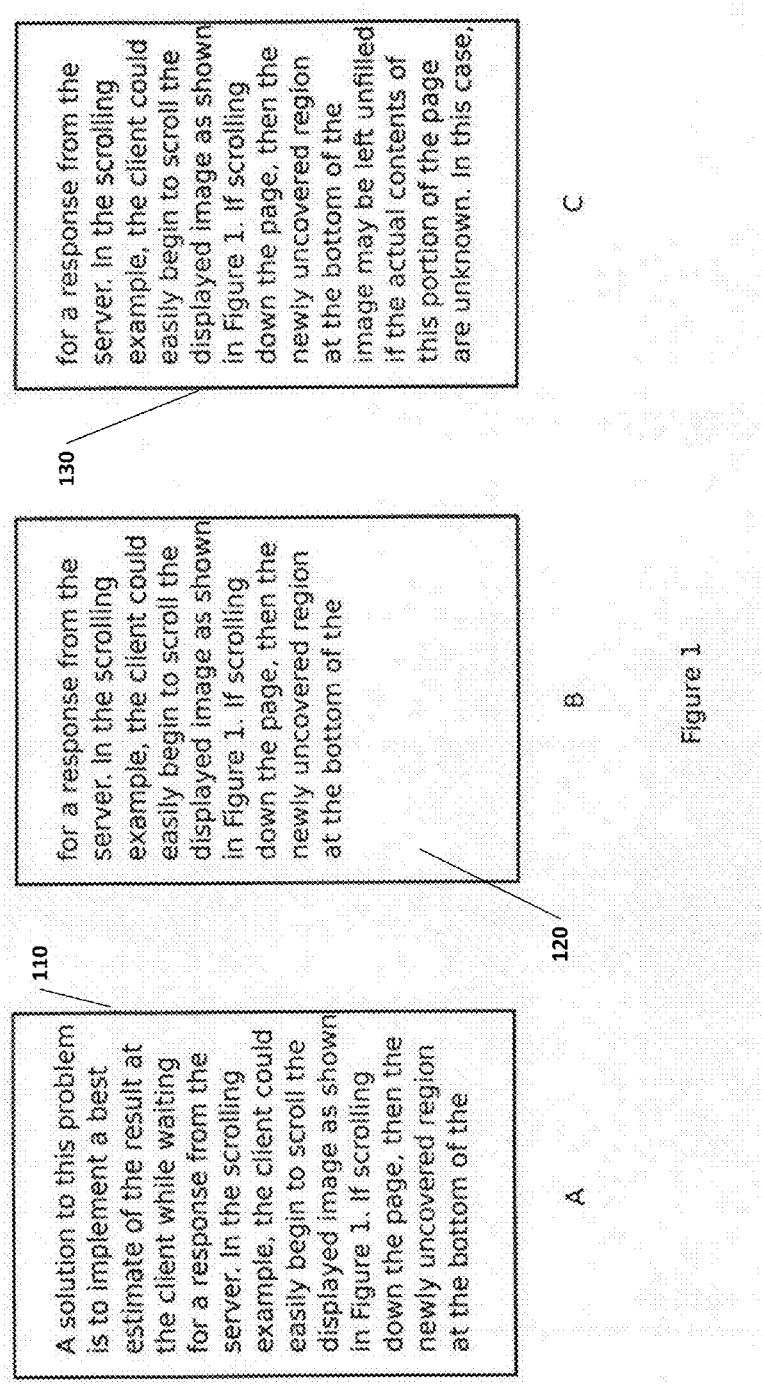
FIG. 1 illustrates an example of a client scrolling operation with a display image in part A, a scrolled down the page newly uncovered region at the bottom of the image left unfilled in part B and a server provided portion substituted in place of the decoder's estimated version in part C according to one embodiment of the present inventions.

The interactivity enabled by applications such as web browsing comes with a cost. Communication with external servers introduces latencies, particularly when the bandwidth of the various communication channels are limited, either due to traffic congestion, inadequate network infrastructure, or signal fluctuations of the type often encountered on the fringes of a wireless network. Additional delays may also be encountered due to cost and power limitations imposed on the client devices needed to receive, process, and convert the data into displayable images.

The problems of network throughput and client processing speed are most notable on portable devices such as smart phones, tablet devices, and small notebook computers. Portable devices are more likely to be dependent on slower wireless networks such as the current 3G/4G infrastructure offered by wireless carriers. Furthermore, the manufacturers of such devices are reluctant to invest in more powerful CPUs, Graphics Processing Units (GPUs), or additional memory, not only due to the higher associated cost, but also due to the increased power consumption and the consequent effect on battery life. Therefore, the benefits associated with interactivity are often accompanied by long delays, and even freezing or general lack of responsiveness experienced while the processor is busy rendering usable images from the data received in response to the interactive requests.

Compatibility is another problem encountered not only with interactive applications such as web browsing, but also with video codecs. For example a video decoder may be designed to support one or more of the most common video compression formats, but incompatibilities are inevitably encountered due to the many different levels of conformance permitted by a particular compression standard. Compatibility problems are also a hindrance to the introduction of new applications and innovations, as such introductions may need to be delayed until a sufficient population of compatible receiving devices are introduced.

This disclosure introduces an alternative solution for delivering interactive applications to client devices having access to the internet cloud. It enables complex applications to run on low cost portable hardware with improved responsiveness and performance. The invention also addresses the problem of achieving compatibility across a wide range of client hardware and client operating systems. The solution involves the use of common video compression techniques suitably modified to enable a wide range of interactive applications.

According to the present inventions, processing and rendering functions are generally shifted from the client device to a server device located within the internet cloud. Ideally, the servers would be located where a high-speed connection to the internet backbone is readily available. In addition, each server may comprise the latest processing technology, which may include fast multi-core CPUs, GPUs, large pools of fast random access memory, and video encoding hardware. A single server or server module may be designed with sufficient performance and multiplexing capabilities to simultaneously service multiple client connections.

In general, the client device may be simplified for operation as a general user input and display device, with basic 2D scaling capabilities, and combined with a suitable video decoder. At present, portable devices such as smart phones, tablets and small notebook computers are typically designed with H.264 and other decoder cores already integrated into a single integrated circuit including the main CPU, GPU, and most peripheral interfaces. Fortunately, H.264 is generally considered to be the most powerful compression format for general video imagery to date, and current low-cost implementations are often compliant with the high profile, high level classification of the standard. This makes them compatible with the most efficient compression features specified by the compression standard, and capable of full high definition resolution and frame rates. Furthermore, such single-chip devices are typically designed with the latest process technology in order to deliver excellent performance at a low per-unit cost and with minimal power dissipation.

The most important benefits of the invention are due to synchronization methodologies between the servers and the client devices. As suggested, the major processing tasks are offloaded from the client to the server and the results are conveyed to the client as a compressed video signal. The client could simply receive and decode the video signal, and display the result as a sequence of image frames as disclosed by Pearlman et al. (US2009/0225828). However, this would lead to a significant reduction in responsiveness. For example, if the user wished to scroll down the page, a scroll command would need to be relayed to the server. Typically, the time spent acting upon the request at the server combined with the time elapsed at the client while decoding and displaying the result is relatively small when compared to the time spent conveying the information in both directions. For example, round trip delays encountered on typical cellular networks currently range near 150 ms to convey a mere single IP packet. Therefore under ideal conditions, the user should expect a delay of at least 150 ms before detecting any sort of response to inputs such as the scrolling gesture.

A solution to this problem is to implement a best estimate of the result at the client while waiting for a response from the server. In the scrolling example, the client could easily begin to scroll the displayed image 110 shown in FIG. 1A. If scrolling down the page, then the newly uncovered region 120 at the bottom of the image may be left unfilled if the actual contents of this portion of the page are unknown (FIG. 1B). In this case, a blank background at 120 serves as a reasonable estimate of the unknown region. Meanwhile the server will receive the same scrolling request and will generate the information that is needed to restore a complete image at the client. The server could then generate and transmit a compressed sequence of scrolling images that could be reproduced at the client and substituted 130 in place of the decoder's estimated version (FIG. 1C). A solution to the problem of synchronizing the sequence of compressed images with the displayed image at the client will also be disclosed.

Note that the simple act of sending a scrolling request marks the first departure from the normal operation of a video codec. Specifically, all modern video codecs are designed to infer movements or displacements between one or more previously transmitted video frames and the current frame, and this difference information is used to extrapolate these one or more previous frames in order to form a best estimate of the current image. The information needed to derive this best estimate is included in the transmitted bitstream in order to enable the decoder to derive the same exact estimate. In this way, only the difference between this best estimate and the actual image needs to be compressed and transmitted. Thus the estimators in the server and the client are preferably the same kind of estimators because the compressed data stream only accounts for the difference between the estimated and actual images. A well-known process that is often used to estimate images is known as motion compensation and in this case, the information that is needed to derive the best estimates are known as motion vectors. The process of generating motion vectors is called motion estimation, and although computationally intensive, the process only needs to be performed at the encoder where the processing cost is often less important.

Figure 2:
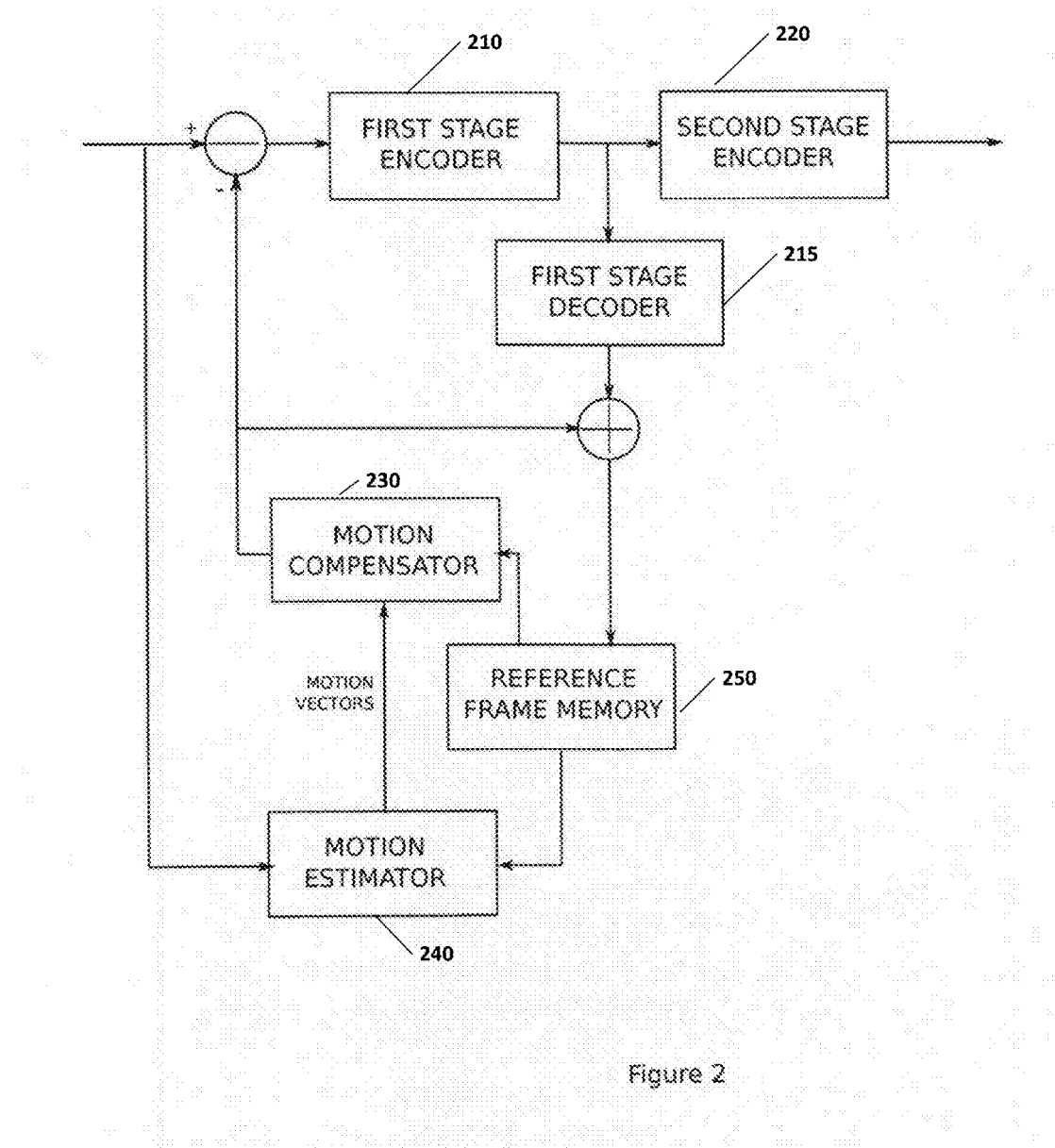
FIG. 2 illustrates a simplified block diagram of a typical video encoder according to one embodiment of the present inventions.
Figure 3:
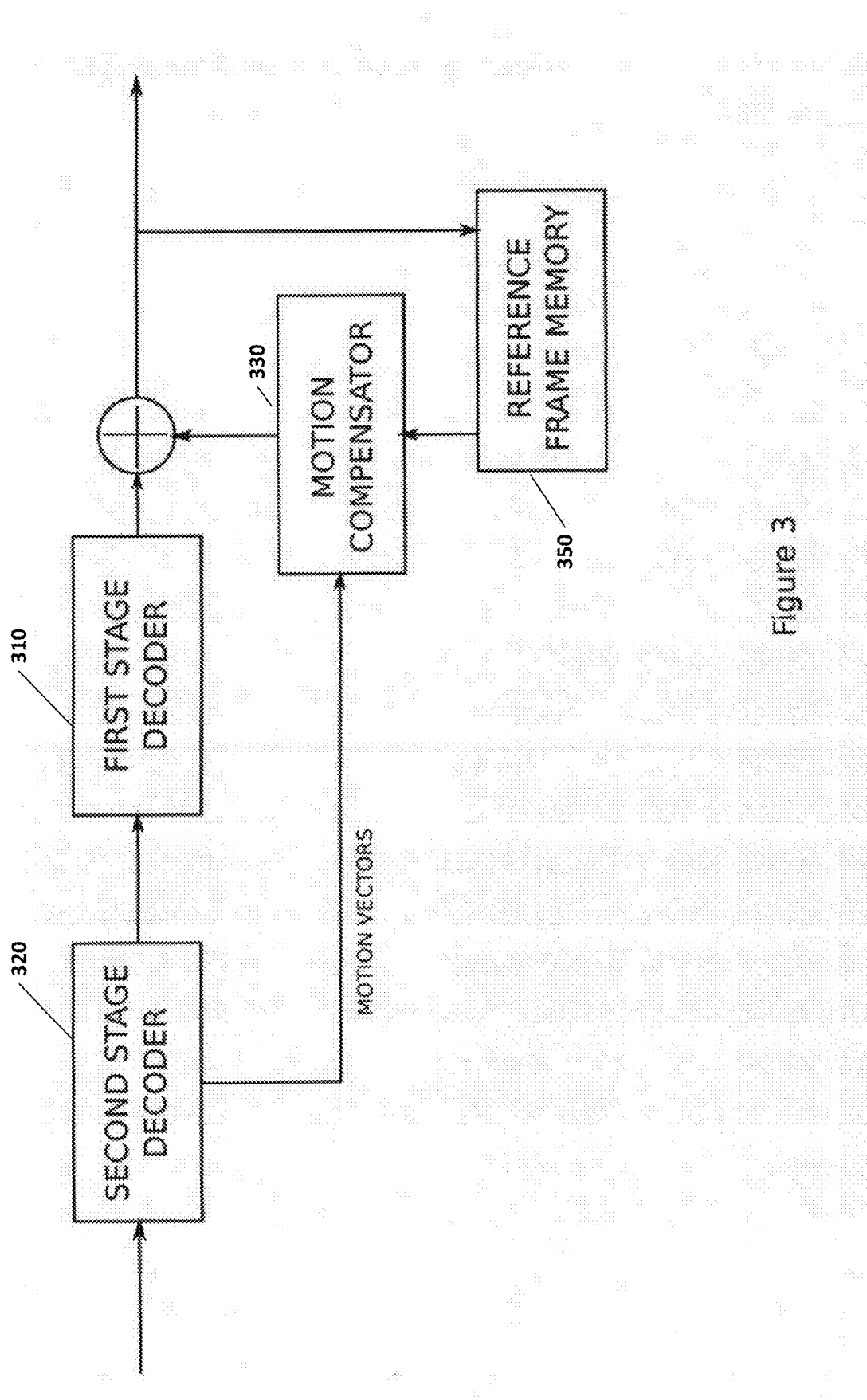
FIG. 3 illustrates a simplified block diagram of a typical video decoder according to one embodiment of the present inventions.

A simplified block diagram of a typical video encoder is shown in FIG. 2 and a simplified block diagram of a typical video decoder is shown in FIG. 3. It should be noted that the primary distinction between the first stage encoders 210 or 410 and second stage encoder 220 or 420 is that the first is lossy and the second is lossless. Lossy compression techniques, such as the combination of transform coding with coefficient quantization, can be used advantageously to achieve very high compression ratios. However, the video images are degraded in the process. An approximation of the original source content can be recovered through the application of first stage decoders 215, 310, or 415, or 510. Lossless compression techniques, on the other hand, include arithmetic coding and other variable length codeword representations, and although compression ratios are limited and dependent on content, there is no loss in video fidelity. The effects of the second stage encoder process can be fully reversed by second stage decoders 320 or 520. A motion compensator module 230 or 330 or 430 or 530 is used at both the encoder in FIG. 2 and the decoder in FIG. 3. The encoder also includes the motion-estimator module 240 or 440. Note that in the case of this scrolling example, this computationally intensive and error prone processing step may be omitted since the motion vector information is implicitly specified by the scrolling command itself.

Figure 4:
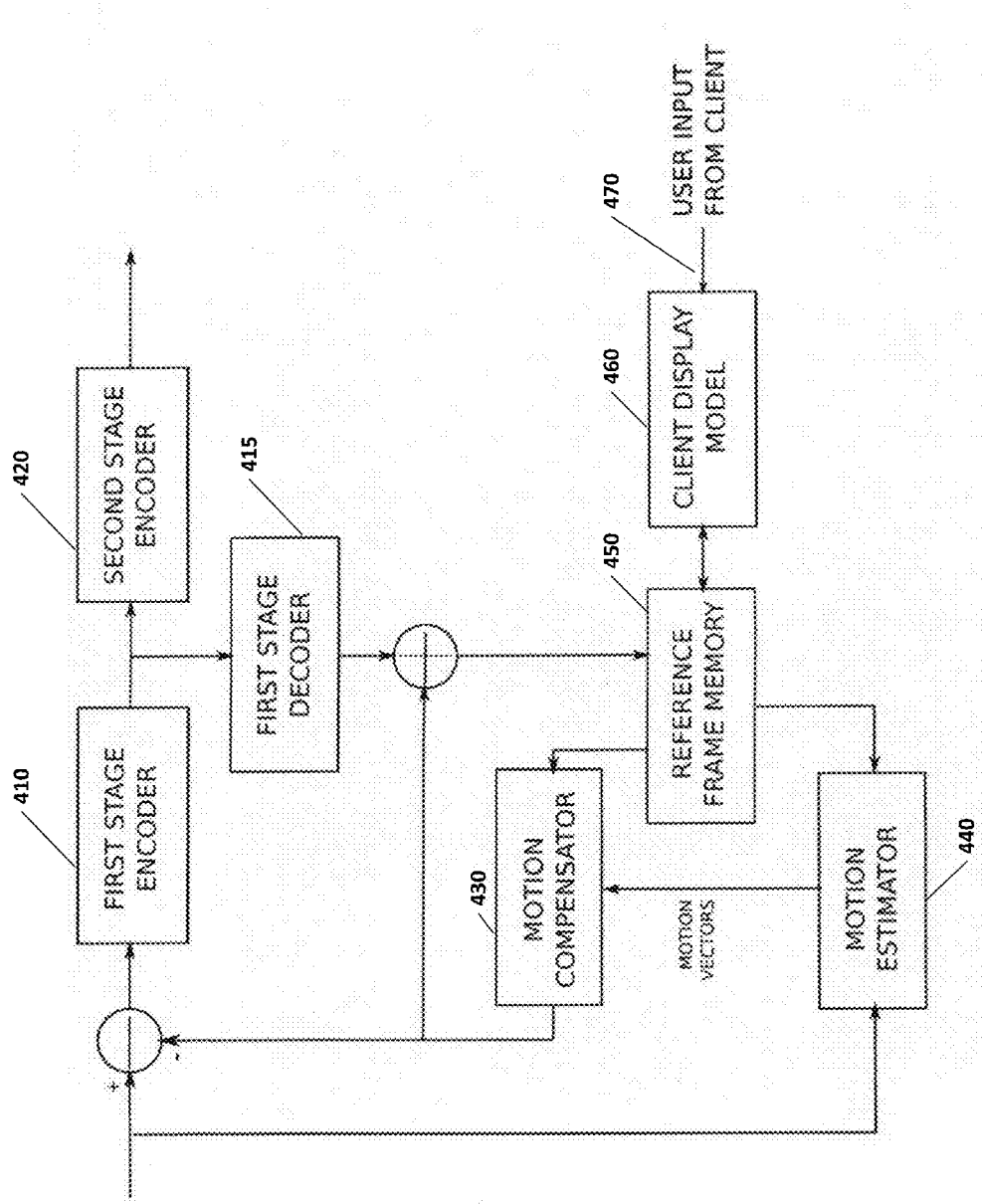
FIG. 4 illustrates a modified block diagram of a typical video encoder in a server according to one embodiment of the present inventions.
Figure 5:
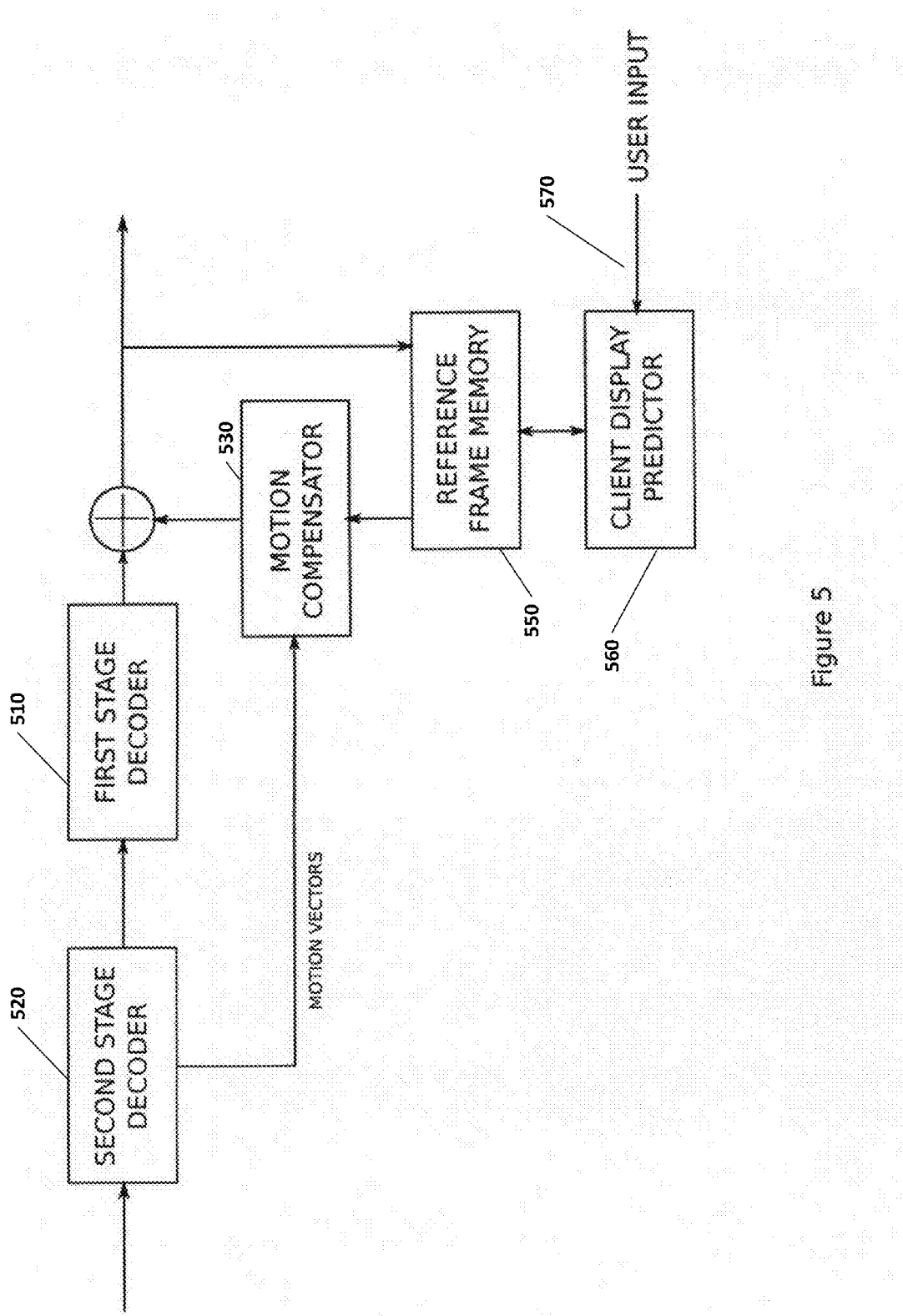
FIG. 5 illustrates a modified block diagram of a typical video decoder in a client according to one embodiment of the present inventions.

Unfortunately, the scrolling example is perhaps the only form of user input 470 or 570 that is so easily adapted to the simple motion vector model assumed by modern video codecs. For this and other reasons, an alternative approach is suggested. Instead of tampering with the motion estimation process, the estimated predictor frames can be generated using the same method adopted by the client device. In this way, when the scrolling command is received at the server, a similar scrolling process could be applied to the corresponding identical image maintained by the video encoder. Note that the uncovered region at the bottom of the window must be filled in with the exact same blank background as used by the client. But now a different modification to the video encoder is necessary in order for this method to work. The reference frame memory 450 must be modified by client display model 460 in the same way that reference frame memory 550 is modified by client display predictor 570 at the decoder. This causes motion compensators 430 and 530 to use an identical modified predictor frame in place of the reference frame that would otherwise be used to predict the next image. This is illustrated in the modified encoder of FIG. 4 and the modified decoder of FIG. 5.

The preferred implementation involves modifying the reference frames as they exist in memory but it would also be possible to substitute the externally-generated predictor frame in place of the predictor frame as it exists at the output of the motion compensator module. However, an advantage of the preferred approach is that it enables a simpler, more accessible modification to current encoder and decoder implementations. Perhaps more importantly, the preferred approach permits the externally-generated predictor to be further refined by retaining the motion estimation process. Although this may not be necessary in the case of the scrolling example, where the externally-generated predictor is assumed to be perfect (with the exception of the uncovered region at the bottom of the window and potential approximation errors in the case of fractional displacements), this will not be the case with other forms of user input control such as zooming.

For some applications, it may be sufficient to limit the client prediction process to instances where user input 470 or 570 is detected in the form of zooming and panning. These capabilities have become very important in devices with relatively small displays and have been widely-implemented since the commercialization of the touch-sensitive devices found in smart phones, tablet computers, and notebooks. The panning capability is a simple extension of the scrolling example recently discussed. The scroll command is merely generalized to include a horizontal vector component in addition to the vertical vector component. Acceleration, deceleration, and filtering effects are easily applied in the usual way at the client while insuring that the client models used at the server adopt the same models in order to maintain synchronization.

Figure 6:
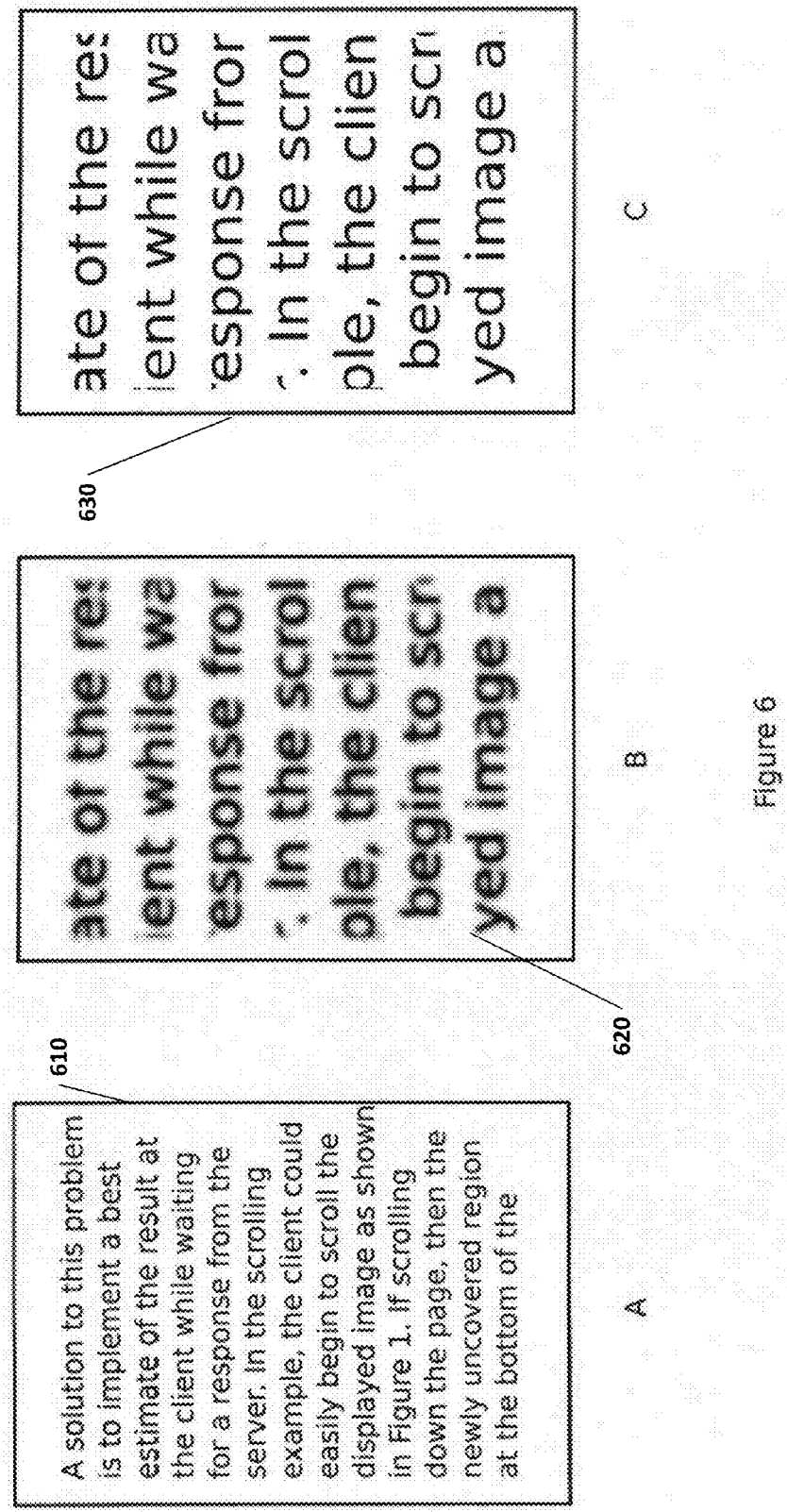
FIG. 6 illustrates an example of a client zooming operation with a region of interest in part A, an interpolated result in part B and an updated result generated using compressed data forwarded to the client in part C according to one embodiment of the present inventions.

A simple example of a zooming operation is shown in FIG. 6. In response to a zooming command from the user, the client will immediately enlarge the image centered around the point of interest by interpolating the image pixels. In this example, the center 610 of FIG. 6A is the region of interest and the interpolated result 620 is shown in FIG. 6B. At the same time, the zooming command is forwarded to the server which proceeds to mirror the same interpolation operation performed by the client. The resulting image 620 is substituted in place of the latest image maintained in reference frame memory. The zooming command is also made available to the core application running on the server which will perform its own reconstruction. In the case of a web browser application, this may involve the re-rendering of text fonts or other objects that are generated internally. Web browsers typically use html or other coding languages to render text and other objects such as images and embedded multimedia. The result should be a sharper, higher resolution reproduction 630 that is otherwise similar to the externally-generated estimate 620. However, the estimate serves as an excellent predictor and allows the difference image to be compressed much more efficiently than if the predictor had not been available. The compressed result is then forwarded to the client which then reproduces the same high quality version 630 that was generated by the core application (FIG. 6C).

At this point it should be mentioned that the most efficient encoders are often configured to use bidirectional prediction and more than one reference frame when predicting a next frame. Multiple reference frames may be used advantageously to derive a more accurate estimate of the next frame, particularly in the occluded areas near the edges of moving objects. However, additional latency must be introduced if bidirectional prediction is supported, since the frames must be delayed and transmitted out of order in this case. Therefore, a good compromise may be to support multiple preceding reference frames, thereby improving predictor accuracy while avoiding the increased latency associated with bidirectional prediction. The server and client models are easily adapted to support multiple reference frames. However additional effort may be needed if attempting to modify existing encoder and decoder implementations such that the memory addresses of all reference frames are adjusted each time that the context is changed. For simplicity, subsequent descriptions of the various preferred embodiments will be limited to a single reference frame used for prediction.

Figure 7:
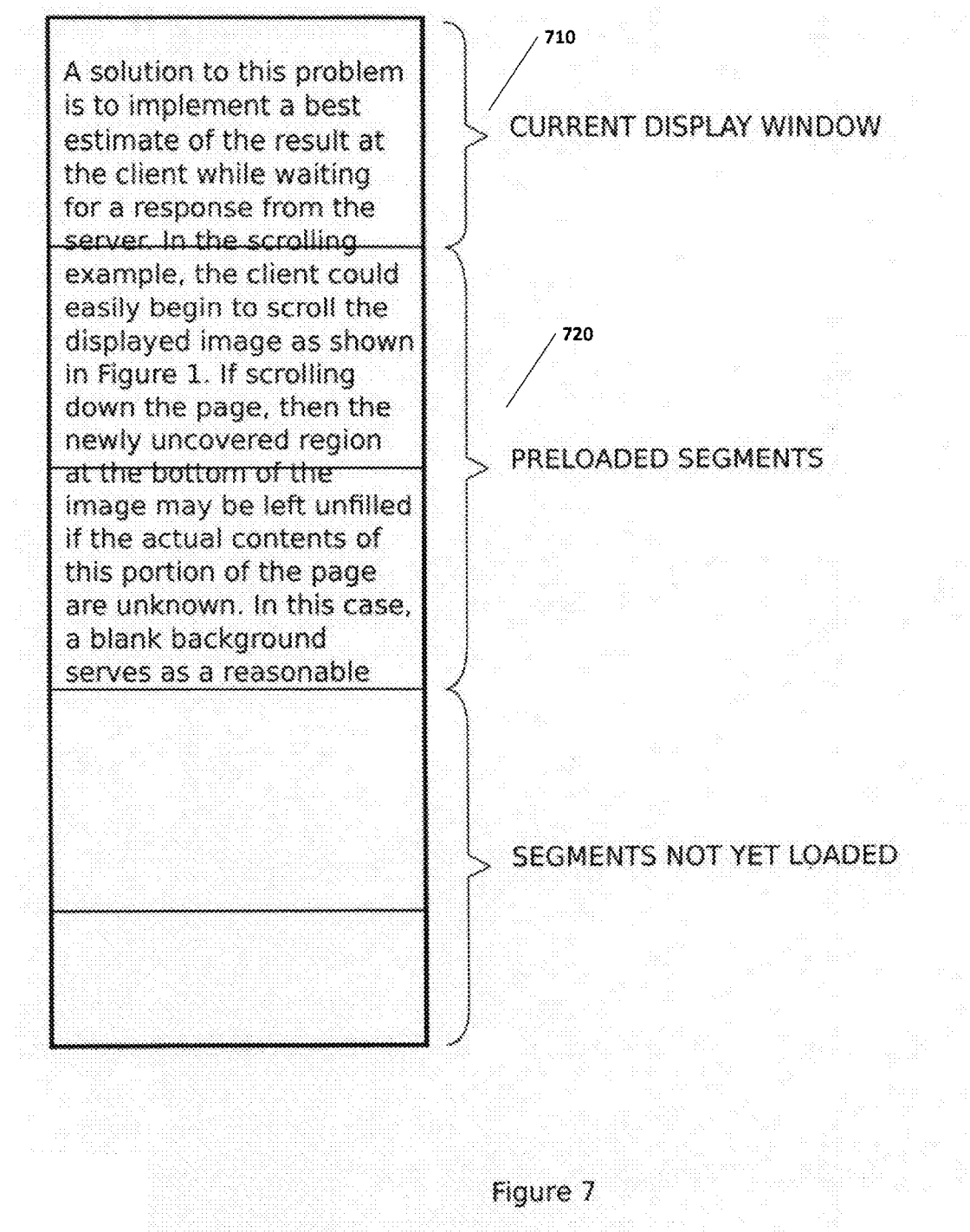
FIG. 7 illustrates an example of display from one section of memory while a codec fills a different section of memory according to one embodiment of the present inventions.

It may now be apparent that the encoder and decoder modification which permits reference frames to be modified, can also be leveraged to achieve another important result. It now becomes possible to reposition the decoding window within a larger image canvas independent of the position of the display window. That is, the decoder may be displaying video from one section of video memory while the codec is occupied filling in or updating a different section of video memory. This capability may be used advantageously to fill in the larger canvass in anticipation of panning commands from the client. For example, when a new web page is requested, it is not uncommon for the page to contain more pixels than the display can accommodate. In this case it would be advantageous to prioritize the transmission such that the top-most region 710 of the page matching the size of the display window is transmitted first. However, in such cases, there is a high probability that the user will eventually begin to scroll down the page in order to access additional content 720. Therefore, in order to avoid future delays, the encoder can begin to download the rest of the page as a series of segments 720. This is illustrated in the example of FIG. 7 where the size of each segment is matched with the size of the display window. Note that there may be little reason to provide a reference frame at all when new content is being loaded and no useful predictors exist. In such cases, it is usually better to configure the encoder to bypass the temporal prediction step, as the use of such temporal predictors could reduce compression efficiency. However, even when stripped of temporal prediction, the remaining spatial image compression capabilities of the H.264 codec are state of the art and superior to common 2D compression formats such as JPEG.

Once the video codec is modified to permit large canvases of memory to be loaded as a series of sequential segments, several advantages become apparent. For example, the problem of synchronizing the compressed stream of transmitted images with the image that is displayed at the client, is now solved. In the case of the scrolling example, the unfilled section of the canvas that is revealed as the display window is scrolled, will be filled in as the coordinates corresponding to the compressed images are adjusted accordingly. As described previously, the server will cause the position of the decoding window (and therefore the corresponding coordinates) to be adjusted once it has been informed of the scrolling action of the client.

The segmented larger canvas also enables all of the benefits associated with caching. For example, if the user chooses to return to a section of the page that has already been viewed, then the display window is simply repositioned to the corresponding memory region. If there have been any changes since last visited, or if one or more regions within the display window are in the process of being changed, then these changes can be efficiently conveyed to the client by repositioning the decoding window to the same corresponding section of memory and extracting the contents for use as the current reference frame predictor. Depending on the extent of the changes that have taken place, it is likely that a very high degree of correlation remains between this reference frame predictor and the image produced by the core application after updating the same corresponding region of the page. Moreover, if either the entire window or a portion of the window includes natural video, then the match between content and codec capabilities would prove to be ideal. In any case, the user will be presented instantly with the most recently cached version, and any changes that may have occurred may be efficiently conveyed and reproduced after a relatively short delay.

The separation of the display window from the decoding window can also be applied advantageously when zooming. In this case, there is a problem to overcome. If the display window is gradually being scaled in size, then the resolution of the zoom factor scale could be considered infinite. For example, consider the case where the user settles on a zoom factor of 1.777 for a period of time before transitioning to a zoom factor of 3.233. In one scenario, the server could instruct the core application to assume a scale factor of 1.777 and then proceed to render the entire canvas at this level beginning with the region in the vicinity of the current display window position. Each section may be encoded and transmitted to the client where the sections are subsequently decoded and the pixels copied to a corresponding region of client video memory. When the user initiates the transition from a scale factor of 1.777 to 3.233, the canvas could be interpolated up to the higher resolution scale in order to display an immediate approximation of the higher resolution images. However, requests sent to the server instructing it to regenerate the canvas at each step of the transition to the higher scale factor may prove futile. By the time that the first regenerated sections are received, the current scale factor is likely to have changed. In fact, it is quite likely that convergence will be delayed significantly due to the rendering, encoding, transmission, and decoding of sections that may become useless as soon as the slightly-more-useful next section becomes available.

Figure 8:
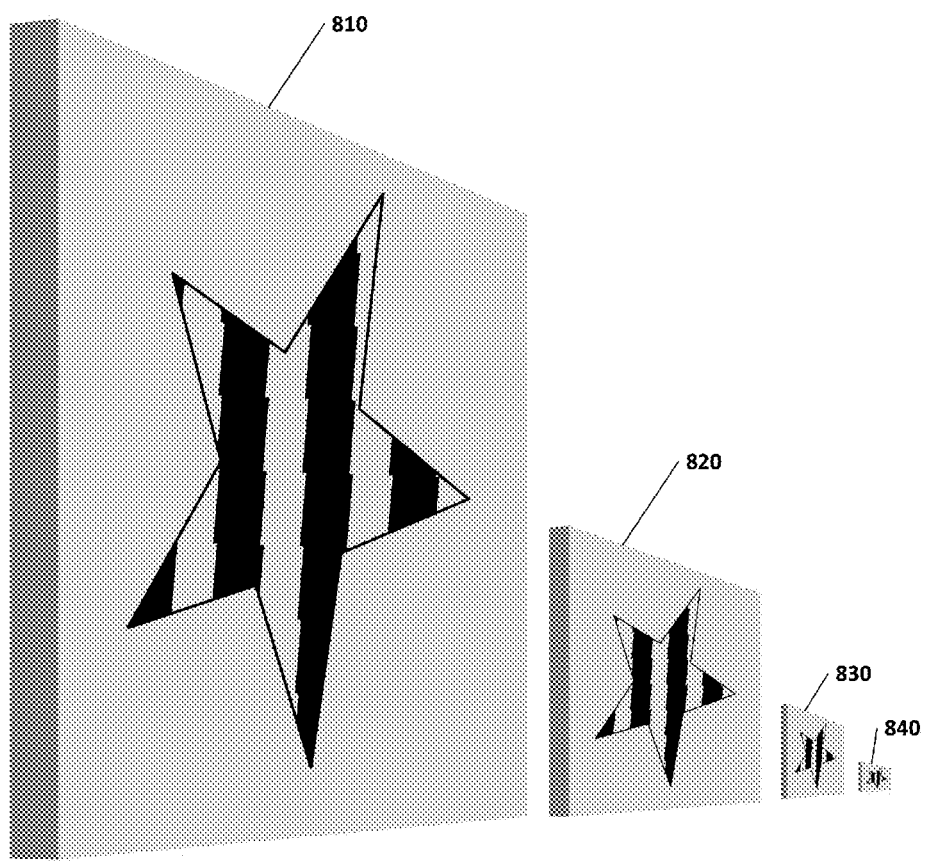
FIG. 8 illustrates an example display of a series of a reproduction of a canvas at a magnification that is half the magnification of a next mipmap to the left and twice the magnification of a next mipmap to the right according to one embodiment of the present inventions.

One solution to this problem is to delay submitting the update to the server until the zoom factor stabilizes. The disadvantage of this method is that the zoomed image will remain blurred throughout the entire transition, and the memory cache will remain void of any sections with corresponding scale factors between the initial and final settings. Therefore, the preferred solution is to adopt a mipmap structure similar to the texture layering scheme commonly used with the OpenGL (Open Graphics Library) rendering language. As shown in FIG. 8, each mipmap 810, 820, 830, 840 refers to a reproduction of the canvas at a magnification that is half the magnification of the next mipmap to the left and twice the magnification of the next mipmap to the right. In OpenGL, the base magnification level 810 is the highest, and the resolution of each successive mipmap is derived from the adjacent mipmap (to the left in FIG. 8) through the application of a bilinear filter. Note that this differs from our examples so far, where the core application might be a web browser attempting to establish a base resolution by matching one of the canvas dimensions with a corresponding display window dimension. In such cases, the ability to zoom in and enhance resolution is more valued than the ability to zoom out beyond the base magnification level. However, a different scenario might be preferred. Instead of matching a display window dimension, the application might be configured to assume a default resolution that exceeds the size of the display window in both dimensions. If the higher resolution images can be rendered at the server without incurring significant additional delay, and if the higher resolution images can be efficiently downsampled, encoded, transmitted, and then decoded and displayed at the client, then this becomes an attractive option. The mipmap solution proves valuable in this case as well. The mipmap filtering steps are implemented with hardware assistance (for example by fast GPUs), and tools for managing mipmaps, such as OpenGL, are readily available, even on small portable devices.

Figure 9:
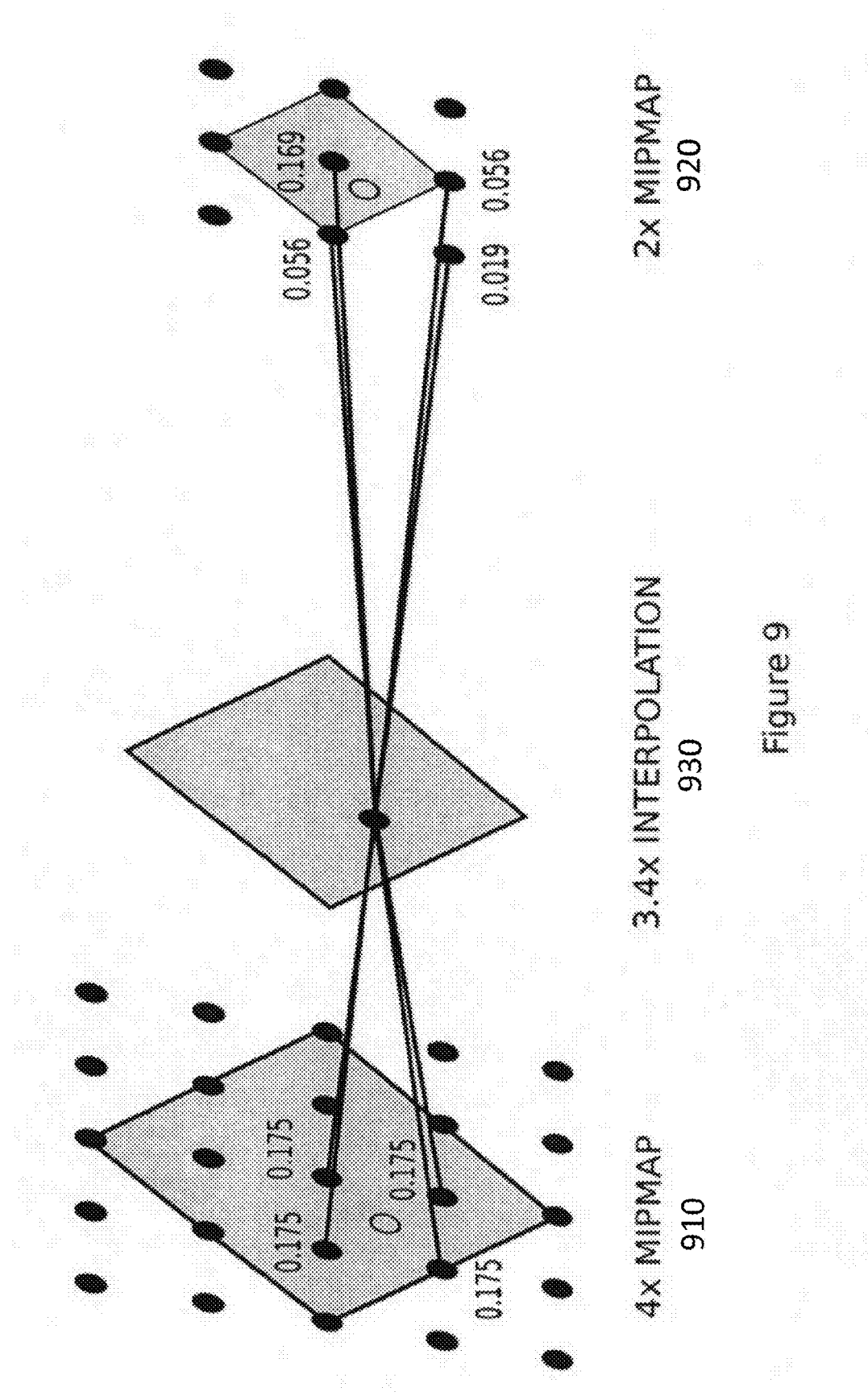
FIG. 9 illustrates an example display of a simple trilinear filter applied to generate an image between two mipmap levels according to one embodiment of the present inventions.

The mipmap structure has an important advantage when applied to the problem of client and server synchronization, as it further decouples the client display process from the client decoder, server encoder, and core application processes. The client display process observes the current window position and current magnification level and generates the pixels by accessing one or more mipmaps. For example if the display magnification level is 3.4, then the pixels may be derived either by upsampling the mipmap corresponding to magnification 2×, or by downsampling the mipmap corresponding to magnification level 4×, or by interpolating between the 2× and 4× mipmaps. The downsampling option may be preferable to the upsampling option as the resulting image will appear sharper. On the other hand, the downsampling option may be more likely to exhibit aliasing artifacts when using simple bilinear filters. Bilinear interpolation is typically used in the similar OpenGL operation, but longer 1D or 2D filters could be used to achieve slightly better results. If the interpolation 930 is performed between two mipmaps 910 and 920, then a trilinear or anisotropic filter may be used. Filtering between two mipmaps 910 and 920 has the advantage of avoiding visible transitions when the scale factor is varied across a mipmap boundary. An example of a simple trilinear filter applied to generate an image between two mipmap levels 910 and 920 is shown in FIG. 9.

When using mipmaps, the server does not need to synchronize or be aware of the interpolation and filtering details of the display process at the client. The server only needs to deliver the information needed for the client to generate the mipmaps, while maintaining an identical set of mipmaps for its own use. It is useful to establish a set of rules for generating and conveying mipmaps as outlined in the flowchart of FIG. 10. However, it should be realized that these rules are merely guidelines describing a preferred embodiment of the invention and many variations are possible while remaining within the scope of the invention.

Figure 10:
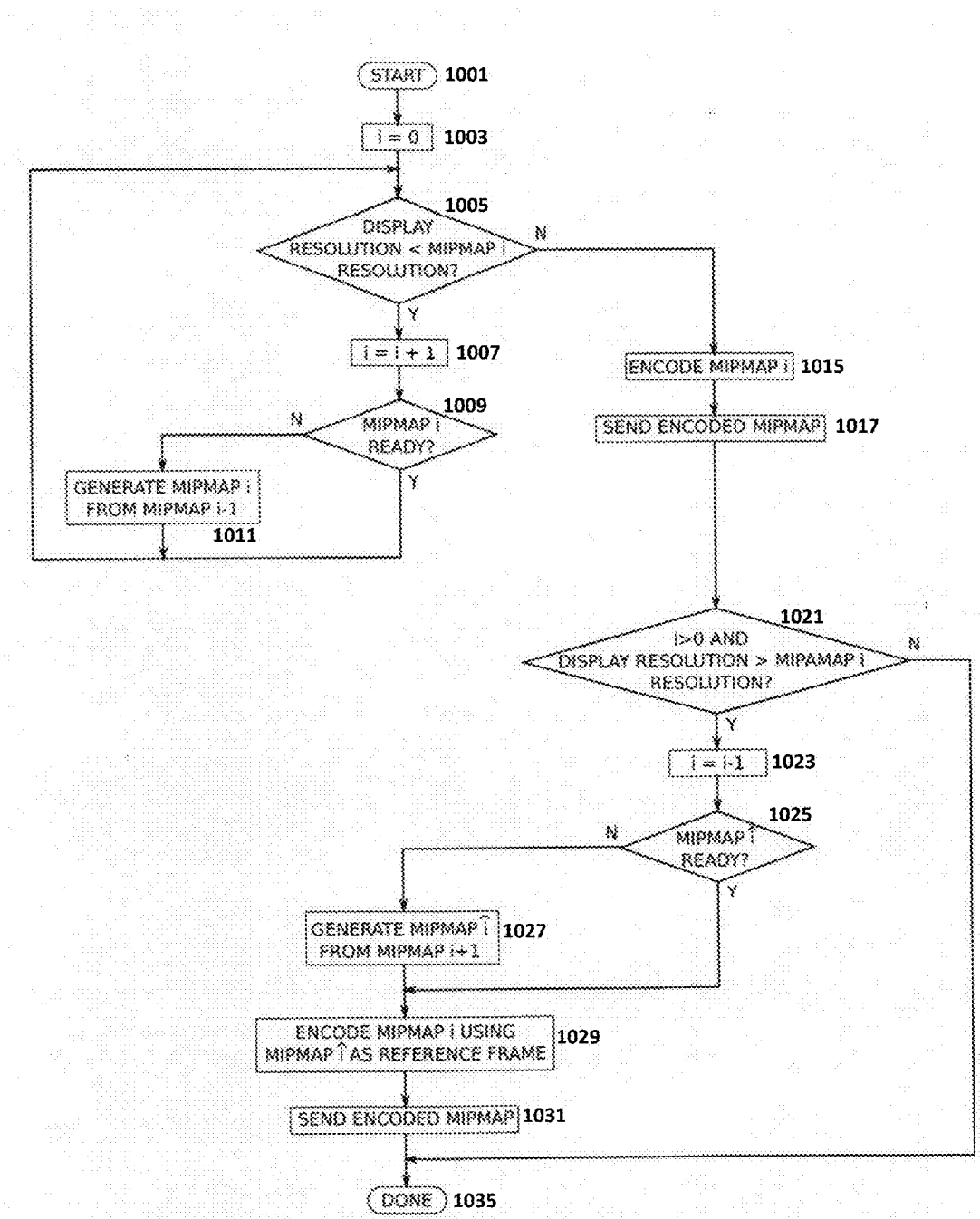
FIG. 10 illustrates an exemplary flowchart for generating and conveying mipmaps according to one embodiment of the present inventions.

FIG. 10 illustrates an exemplary flowchart for generating and conveying mipmaps according to one embodiment. After start 1001, set i=0 at step 1003. At step 1005, check if display resolution<mipmap i resolution. If yes, proceed to step 1007 and set i=i+1. Then determine at step 1009 if mipmap i is ready? If no, generate mipmap I from mipmap i−1 at step 1011 and return to step 1005. Otherwise if yes, return anyways to step 1005. At step 1005, if display resolution<mipmap i resolution is not, then go to step 1015 and encode mipmap I and at step 1017 send the encoded mipmap. Thereafter at step 1021 check if i>0 and display resolution>mipmap I resolution? If yes, set i=i−1 at step 1023. Thereafter check if mipmap i hat is ready at step 1025. If no, then generate mipmap i hat from mipmap i+1 at step 1027 and thereafter encode mipmap i using mipmap i hat as a reference frame at step 1029 and thereafter send the encoded mipmap at step 1031 and finish 1035. If at step 1035 it is yes ready, proceed to step 1029 and onwards.

The core application will begin to generate an image at a particular base resolution when it is launched. This image will be copied to memory and will comprise either a portion of, or the entire first mipmap. This first mipmap is referred to as mipmap level 0 at 1003. Suppose that we wish to reproduce the entire image at a particular client. If the display resolution at the client is less than the resolution of the first mipmap, then the image is successively downsampled by powers of 2 at 1011 until the resolution becomes less than or equal to the desired resolution of the client display (1005). The first time the image is downsampled by a factor of 2, the result is stored in memory as mipmap level 1. If additional downsampling is needed, then mipmap level 1 is downsampled by a factor of 2 to produce mipmap level 2, etc. The last mipmap (level i) is encoded at 1015 and sent to the client at 1017 where it will be decoded and saved as mipmap level i. This mipmap can now be used to generate the first displayed image.

If the desired display factor at the client exactly matches the resolution of mipmap level i, then the mipmap image is simply displayed as is, otherwise it must be enlarged. One way to enlarge the image is to perform a trilinear interpolation between mipmap levels i and i−1. However, since the server has only transmitted mipmap level i thus far, the client will first perform a bilinear interpolation of mipmap level i to generate mipmap level i−1. This is in contrast to OpenGL applications where only lower resolution mipmaps are generated by downsampling a higher resolution mipmap.

Once the decoder is displaying a first image by interpolating between mipmap levels i and i−1, the next step is to refine the accuracy of mipmap level i−1. This is easily accomplished by adjusting the reference frame used by the encoder residing at the server such that it is identical to mipmap level i−1 as it exists at the client. This is achievable by performing a 2× bilinear interpolation of mipmap level i at 1027 in order to mirror the same operation that was performed previously at the client. Since the real level i−1 mipmap already exists at the server, it can now be forwarded to the encoder, where it will be compressed very effectively at 1029 due to the quality of the reference frame predictor that was generated as an interpolation of mipmap level i. The client then receives and decodes this image in order to reproduce the more accurate representation of mipmap level i−1. As a result, the subsequent trilinear interpolation between mipmap levels i and i−1 should result in a sharper, more accurate image on the display. As in the case of the scrolling example, the updates are asynchronous with the actions of the user, but fidelity improves as the updates are received and applied to the sections of video memory from which the display window is derived.

After the first image is loaded, the user may choose to zoom in on a certain area. As already mentioned, the client can implement the zooming function on its own without waiting for additional information from the server. Continuing with the preferred embodiment, the zooming operation would proceed with high accuracy simply by adjusting the trilinear filter parameters as a function of the desired scale factor. However, once the scale factor is increased beyond the setting corresponding to mipmap i−1, then the trilinear filtering operation switches from mipmap levels i and i−1 to mipmap levels i−1 and i−2. As before, the client may first infer mipmap layer i−2 from layer i−1, while waiting for the server to transmit an efficiently compressed representation of layer i−2 to be used instead.

If the user continues to zoom into the image, then the magnification corresponding to mipmap layer 0 may be exceeded. However, the zooming may still continue by downsampling mipmap level 0 to mipmap level −1 in the usual way. The difference in this case, is that the server does not already contain mipmap layer −1 in its memory, and the core application must be instructed to zoom out by a factor of 2 in order to generate it. However once this step has completed, the mipmap is compressed using the previous mipmap as a predictor, and forwarded to the client in the usual way.

The zoom-out operation is implemented in the same way as the zoom-in operation, but in this case the lower order mipmaps should already be present in memory. Even if the client chooses to zoom out beyond the level of mipmap layer i, additional mipmaps can be generated at the client in the usual way. However, requests for more accurate mipmaps are not necessary in this case since the images are being downsampled instead of upsampled. The only problem is that the lower resolution mipmaps may not contain enough pixels to fill up the display window. Therefore, if additional information is in fact available, then the core application must provide it. The steps are very similar to the process of panning as described earlier with reference to FIG. 1 and FIG. 7. Ideally, the server would have continued to fill in sections of mipmap layer 0, while not otherwise busy, in anticipation of future panning or zoom-out requests such as this. In any case, the missing information will be generated by the application as soon as it is notified that these regions are now a high priority. Modified sections of mipmap layer 0 are subsequently encoded and forwarded to the client where they are decoded and applied to fill in the lower resolution mipmaps until the display is complete. Note that the same procedure applies equally well when the missing display sections are caused by panning instead of an outward zoom.

There are many options when guiding the core application to fill in the mipmap tree, thereby filling the cache in anticipation of requests from one or more clients. A preferred option is to give priority to mipmap level 0. The tree should be calibrated such that level 0 can be rendered efficiently by the client and is of a sufficiently wide scale that a single page presents a good overview or summary of the content. Level 0 should maintain priority at least until the user increases the magnification level. For example, if the magnification level becomes greater than 1 but is less than or equal to 2, then the priority would change from level 0 to level 1. Once the level is updated to sufficiently source the display window, then the same level could be further extended one section at a time, in anticipation of likely user palming behavior. Similarly, if the magnification level becomes greater than 2 but less than or equal to 4, then the priority would change from level 1 to level 2. Depending on the application, one may choose not to burden the application with levels lower than 0, as these lower levels may be derived by adding sections to level 0 which may then be downsampled to generate the lower resolution mipmaps.

Eventually, the client will exhaust all available memory, and sections of the mipmap tree will need to be reclaimed before any new sections can be created. Similarly the server may exhaust its memory, particularly if the same resources are being shared by multiple clients. Note that it is permissible for either server or client to independently reallocate sections of memory and this may done without mirroring the same operation at the other end. This follows since the missing sections can always be regenerated if needed, while restoring synchronization in the process. For example, lower level mipmap sections at either client or server are easily regenerated from corresponding sections at higher mipmap levels. On the other hand, if the client requires a section that has been deleted, and if a corresponding section does not exist at any of the higher levels, then the missing information must be retransmitted from the server. In the worst case, where the missing section has been deleted from server memory as well, it will need to be regenerated by the application.

Figure 11:
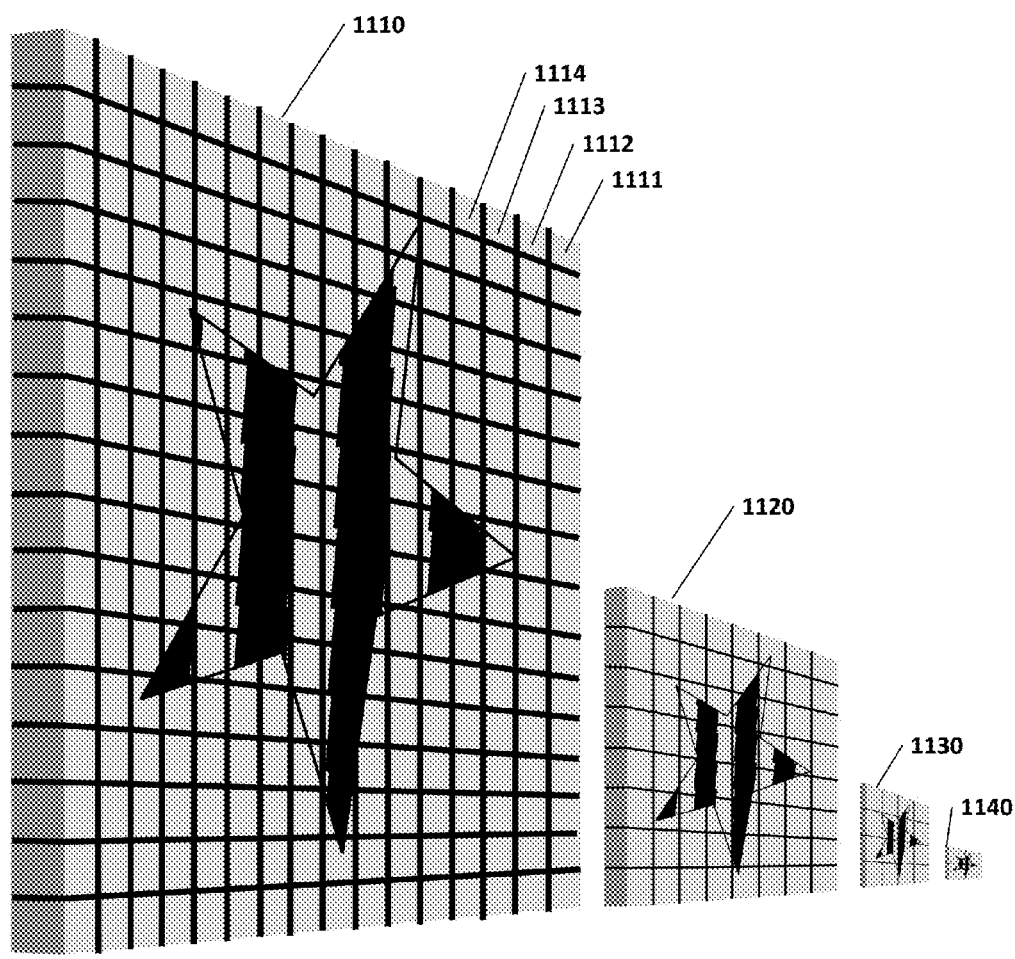
FIG. 11 illustrates an example display of a series of a reproduction of a canvas where each level of a mipmap tree would be comprised of a number of pages according to one embodiment of the present inventions.

One commonly used method for managing memory involves the partitioning of all available memory into fixed size pages. In this case, each page would represent a 2D block of pixels with fixed horizontal and vertical dimensions. Each level of the mipmap tree 1110, 1120, 1130, 1140 would be comprised of a number of pages 1111, 1112, 1113, 1114 as shown in FIG. 11. Note that adjacent pages at each level of the tree may correspond to entirely different sections of the memory pool. This simplifies the problem of releasing pages from one section of the tree so that they may be remapped to another. An efficient method for assigning and recycling memory pages may be based on a simple last-access policy. That is, the page having the longest interval between current time and the time of last access would be first in line for reassignment. The model can be further optimized by assigning higher importance to the pages that cannot be entirely regenerated from corresponding pages at a different level of the mipmap tree. Note that if the pages are suitably aligned from one level to the next, then exactly four pages at level $i-1$ are needed to regenerate a single page at level $i$. Similarly, it would require 16 pages at level $i-2$ to regenerate the same page at level $i$.

The paging model is readily adaptable to well-known memory virtualization techniques where the amount of usable memory is greatly increased through the use of secondary storage such as hard disk or flash memory devices. Paging between main memory and secondary storage may be particularly advantageous at the server where it is desirable to maintain large caches and to support multiple clients. Although additional delays are incurred when paging from secondary storage back to main memory, these delays are likely to be much less than the time needed to regenerate pages that have been deleted due to memory limitations. Paging times will continue to decrease as the performance of secondary storage devices such as flash continues to improve.

Figure 12:
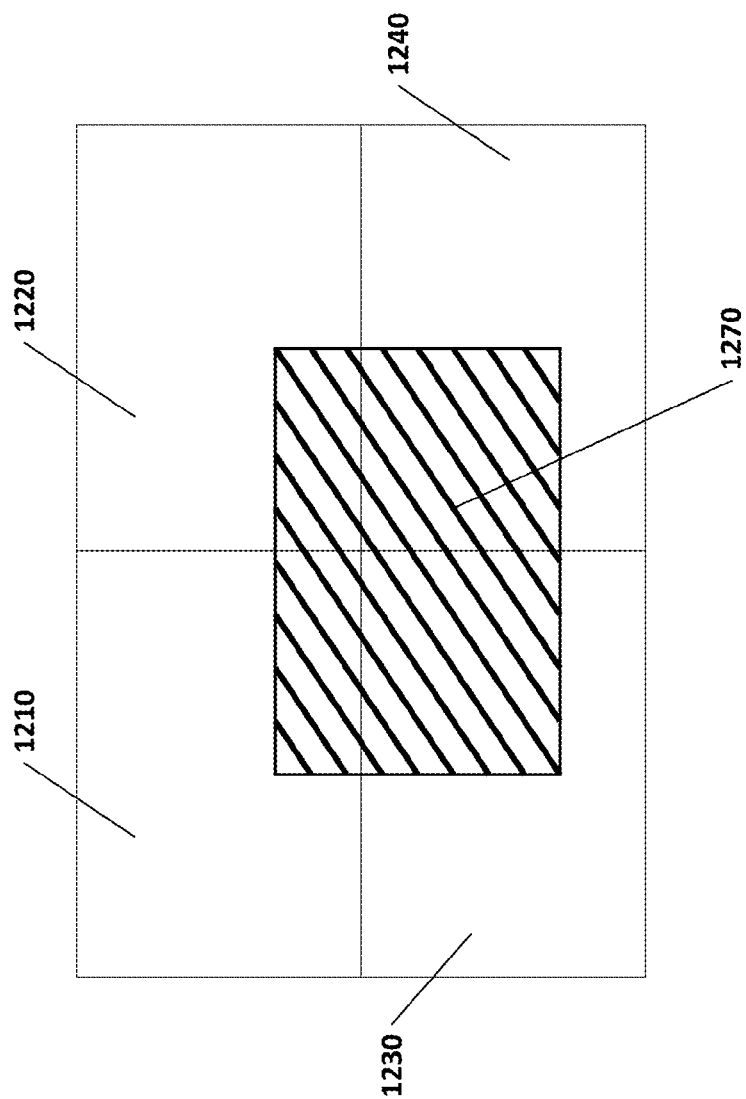
FIG. 12 illustrates a diagram of how four pages of images are combined to generate a display window at a client according to one embodiment of the present inventions.

FIG. 12 illustrates how four pages 1210, 1220, 1230, 1240 are combined to generate the display window 1270 at the client. Note that in this case, the dimensions of the display window 1270 are the same as the dimensions of each page 1210, 1220, 1230, 1240. This is a reasonable design option. In fact, it might be more advantageous to set the page dimension to twice the display dimensions so that the display may be derived either by downsampling the next higher resolution mipmap, or by interpolating between the closest mipmap in each direction, while accessing a maximum of 4 pages per mipmap.

The size of the codec window can also be advantageously matched with the size of the memory pages. This would allow for improved memory access efficiencies while generating the various sections of the mipmap table and while transitioning the codec state from one section to another. However, one of the advantages of this invention is that the size of the codec window is easily changed at any time. For example, it may be more efficient to reduce the size of the codec window when conveying the last remaining regions at the boundaries of a particular canvas. As a second example, a small sub-window could be created within a larger window simply by adjusting the encoder settings and specifying to the decoder the coordinates where the images are to be placed within a reconstructed image. The disclosed system design allows the resolution to be changed at any time while maintaining full encoder compression performance. This may be particularly useful when a single encoder is used to service multiple clients. For example, the encoder might first be configured to generate one or more frames of compressed data at a first resolution for transmission to a first client. The same encoder could then be applied to generate one or more frames of compressed data at a second resolution for transmission to a second client. Each time the encoder is reassigned to a different stream, the reference frame predictor is also swapped, thereby maintaining full temporal prediction capabilities for maximum compression performance.

Resizing of the codec window is also important for a different reason. In some cases, certain applications such as the web browser may be provided with pre-compressed video streams which are to be embedded and reproduced as a sub-window within a larger canvas. Instead of decoding and reencoding the precompressed video stream, it may simply be forwarded to the client along with the coordinates where the sub-window is to be reproduced. On the other hand, if it is determined that the compression format is incompatible with the capabilities of a particular client, then the server would prove valuable as a means for transcoding the compressed stream to a compatible format. In this way, client devices could be simplified and designed with decoding support for a single or very limited number of compression standards. At the same time, the clients would remain compatible with a much wider range of formats as long as these formats are decodable at the server. Note that this simplification of the compatibility management problem applies not only to video compression formats, but to core applications as well. For example, many web pages may not render properly on certain web browsers particularly if the browser implementation has been simplified for use with a particular client platform. However, if the web pages are compatible with the web browser application running on the server as disclosed herein, then the pages are automatically compatible with the entire base of client devices.

The server must be able to detect changes in any section of the image canvas. Ideally, the presence of new information would be signaled by the core application. Alternatively, the server memory subsystem could be designed to detect and flag memory pages that are modified by the application.

The entire page may then be reencoded (using the client representation copy as a predictor) and then forwarded to the client. Regardless of the mipmap level that is modified, all other levels of the tree that have already been filled must either be regenerated or else marked to indicate that the corresponding section of memory is no longer valid. The latter option is preferred as it allows the invalid pages of memory to be recycled, although the missing sections may be easily regenerated if necessary. It is important to convey the same information to the client, so that the corresponding sections of the client mipmap tree may also be marked invalid, thereby maintaining synchronization between server and client.

One important difference between the proposed method of video codec operation and the conventional method should be emphasized. The conventional video codec will typically operate at a constant frame rate. For example, an encoder that is supplied with 30 frames of video each second, will compress and transmit the entire stream to one or more clients where they will be decoded and reconstructed at the same rate of 30 frames per second. Generally, the frame rate remains constant as long as the encoder can successfully compress the stream to a rate that can be accommodated by the transmission channel. The real-time requirement is very important in typical applications where dropped frames will result in visible stuttering in moving regions. This is in contrast to the proposed application where there is no real-time requirement and insufficiently compressed streams will simply incur more delay during the transmission process. Although delays are both undesirable and inconvenient, they can be tolerated, particularly if a good approximation of the final image is presented during this interval. Previous discussions might also have been interpreted to imply that the update process is complete as soon as the first frame is delivered, reconstructed, and displayed. In fact, this is rarely the case. An encoded representation of an image merely enables the decoder to reconstruct a better approximation of an image than it may already have. The quality of the approximation can be further improved by sending second, third, fourth representations, etc. until the image quality is determined to be sufficient. For this particular application, an interesting trade-off is presented. The one or more encoders at the server may be configured to achieve this level of sufficient quality after sending n frame updates, where n is a configurable positive integer greater than 0. If n is set to a low value, for example 1, then the single update frame will comprise a relatively large amount of data, and therefore a relatively long interval will transpire while the data is being transmitted to the client. On the other hand, a much more pleasing result may be realized if n is chosen such that the updates are received at a consistent rate of 30 per second (for example), while generating sufficient data to fully utilize available transmission resources. Of course, in this case n will vary significantly depending on the complexity of the image and the quality of the initial prediction, but the advantage is that the user will be provided with the best reproduction possible at each 33 ms interval. The disadvantage, however, is that the number of clients serviceable by a single encoder will decrease as the number of image updates is increased.

If all images are conveyed to the client as a single update and if the resulting quality of the images reproduced by the client is sufficiently accurate, then the server memory requirement could be reduced. In this case, the server could assume that the client image reproduction is equivalent to the original, and therefore avoid maintaining a local copy of the reproduced client version. Recall that the reproduced version generally serves as the best predictor for possible future modifications, so there is a potential for divergence between server and client if the server assumes that the reproduction is equivalent to the original and yet small discrepancies still exist. Therefore, the preferred embodiment does not take this approach. Instead, additional memory is allocated at the server in order to maintain an original version of all rendered images, as well as a copy of all sections of each client's mipmap tree which cannot be easily reconstructed from populated higher-resolution sections of the same tree. The preferred embodiment also encodes and transmits each modified image as a sequence of multiple updates, such that the number of updates represents a good compromise between efficient channel bandwidth utilization and efficient client multiplexing performance.

Figure 13:
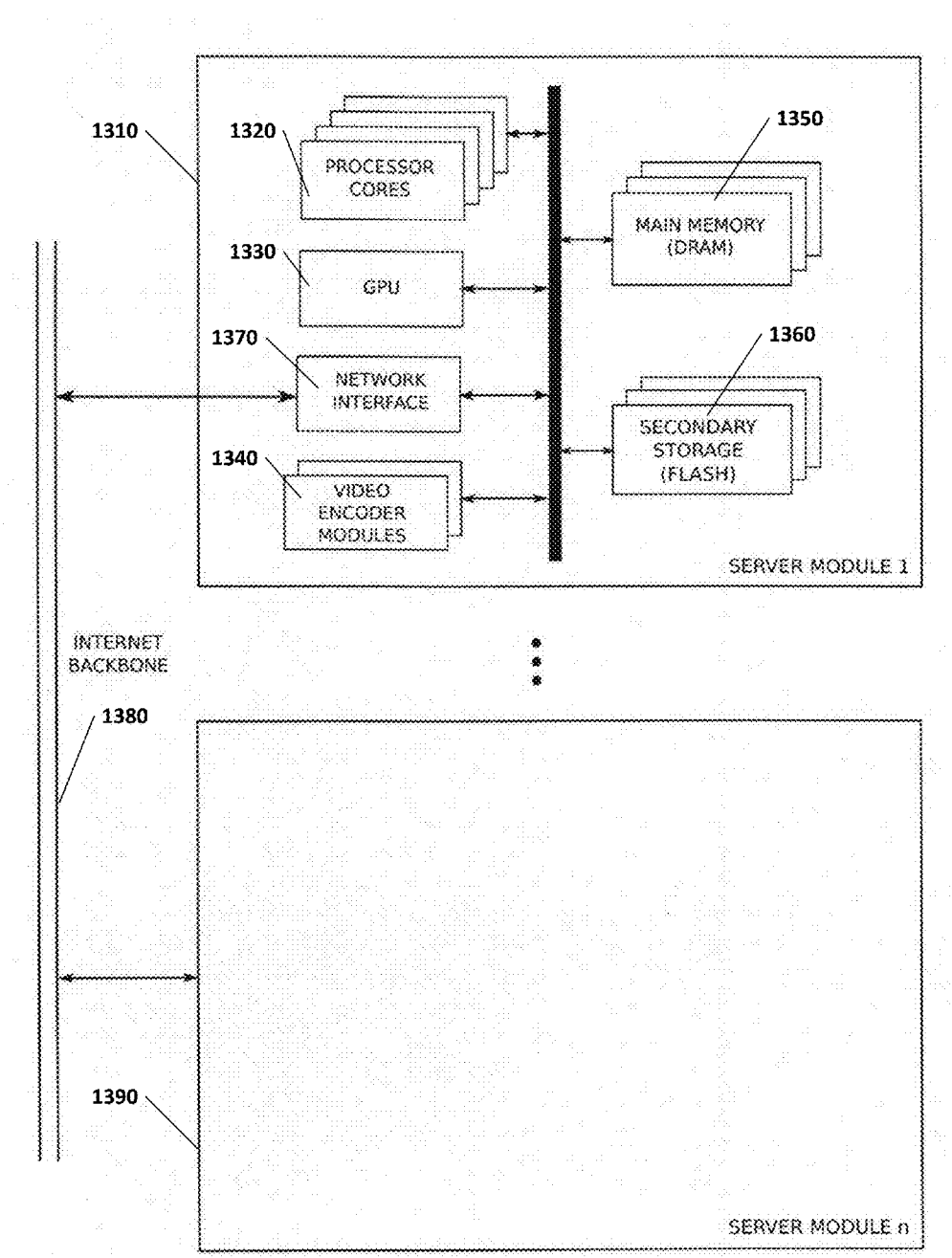
FIG. 13 illustrates a block diagram of an exemplary server subsystem with encoder according to one embodiment of the present inventions.

A block diagram of a server subsystem is shown in FIG. 13. One or more server modules 1310 and 1390 may be combined to form a server cluster. Each server connects to an internet backbone 1380 via a network interface 1370. In this case, a single server module includes a host controller, Graphics Processor Unit GPU 1330, one or more application sub-modules or processor cores 1320, video encoder modules 1340 and a large video memory bank 1350 consisting preferably of DRAM memory ICs. Secondary storage 1360 such as flash memory can be used. A single video encoder can be applied to service multiple clients using the methods of this invention. A core application running in one or more processor cores 1320 could comprise software capable of servicing multiple clients, or it might be comprised of software dedicated to servicing a single client at a time. Multiple core applications can be assembled as needed in order to offer a variety of applications to multiple simultaneous clients.

Figure 14:
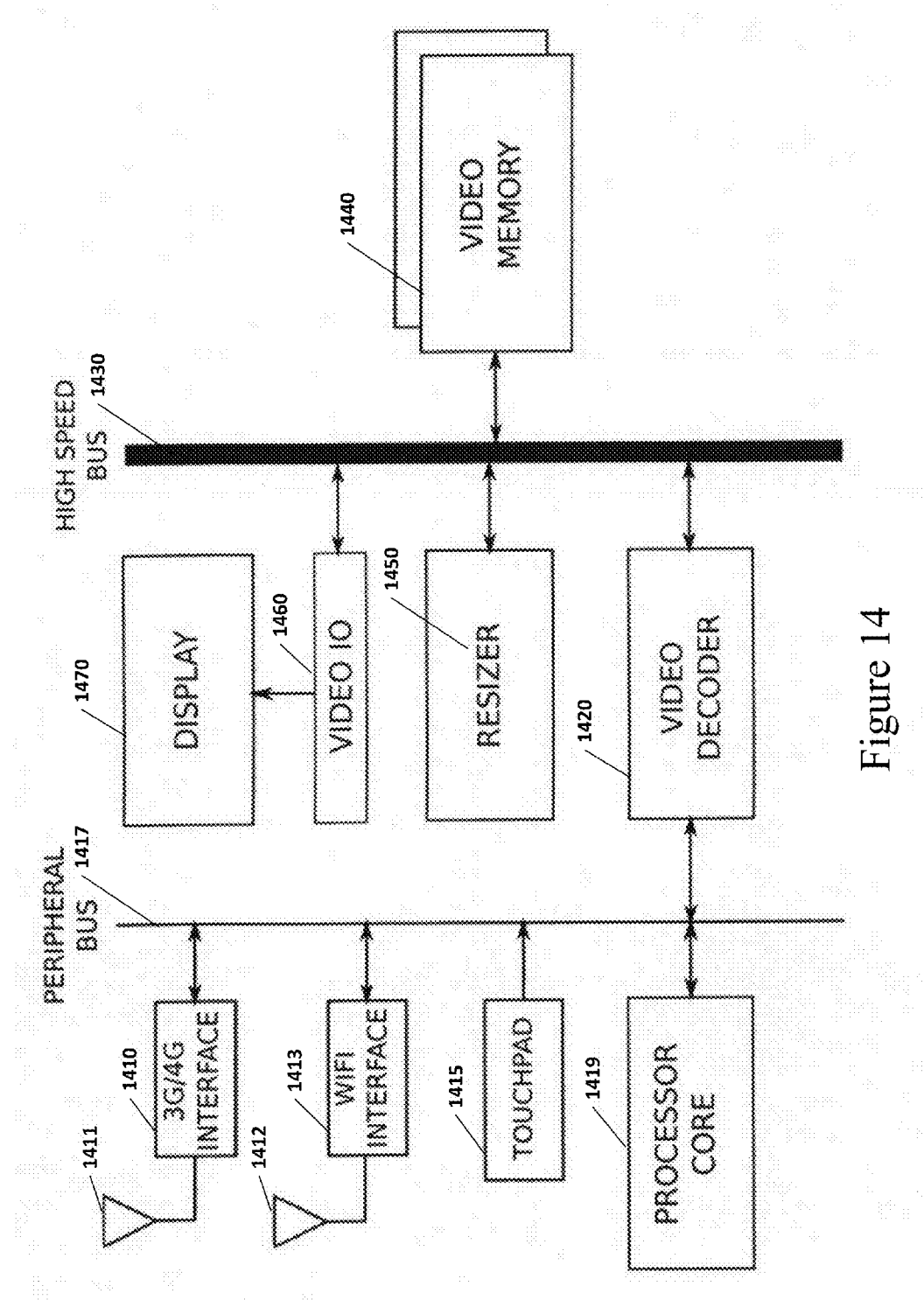
FIG. 14 illustrates a block diagram of an exemplary client with decoder according to one embodiment of the present inventions.

A block diagram of a client with decoder is shown in FIG. 14. The client preferably is portable with wireless access to a network via a network interface such as a 3G/4G interface 1410 or WiFi interface 1413 and respective antennas 1411 and 1412. User input is facilitated in this embodiment via a touchpad 1415. The aforementioned elements connect over a peripheral bus 1417 with a processor core 1419 and video decoder 1420. The video decoder 1420 connects to a high speed bus 1430 as does video memory 1440, a resizer 1450, and a video I/O interface 1460. A display 1470 is connected to the video I/O interface 1460. All of these components are commonly found in current smart phones, tablets, and notebook devices. However, modifications are necessary before the reference frame memory of a typical video decoder can be accessed and modified. It is believed that most decoders are modifiable to enable access to reference frames with adjustments to low level software. However, many implementations do not include convenient fast access between the section of video memory used to store decoded images and the section of video memory that is accessible to graphics manipulation and rendering tools such as OpenGL.

Nvidia recently introduced an interoperability extension to their VDPAU API in order to provide such a bridge between decoder surfaces and OpenGL textures, but this is more applicable to the larger more powerful GPUs found in desktops than the more power-efficient single-chip solutions commonly found in small portable devices. However, this problem is easily solved by introducing slight changes to the API software.

Certain aspects of the invention have been described primarily with reference to two common example forms of user-supplied input—panning and zooming. Both of these inputs modes are commonly used by many different applications and are particularly convenient with smaller mobile devices and devices with touch screens or touch pads. However, many other input modes are directly supported without complication. For example, the select operation, whether entered by pressing a button on a mouse pointer device or by tapping a touch screen or touch pad, can be forwarded directly to the server where it will be provided to the core application. Any effects of this action are likely to become apparent through the modification of images that are generated by the same application and subsequently encoded and forwarded to the client device. However, as with the zoom and pan operations, the client software can be adjusted in order to provide immediate feedback or confirmation, of the operation in progress. For example, consider the web browser application once again. When a web page is conveyed to the client in the form of a compressed sequence of images, additional information could be included to specify the rectangle coordinates corresponding to each hyperlink or other selectable object. If the user subsequently initiates a select request, and if the coordinates of the request matches any of the pre-determined rectangle objects, then the object may be highlighted immediately without waiting for new images to be encoded and transmitted by the server. In fact it would be advantageous to generalize the properties of pre-determined rectangles (or alternative object shapes) and to generalize the concept so that it may be applied to all other applications. For example, each rectangle or other object conveyed to the client could include a list of attributes or a list of instructions to be performed when the object is selected. For example, if the touch screen of a particular client device is tapped twice in short succession, then the coordinates of the touch could be compared with the list of objects associated with the current displayed image. If one or more such objects exist, then the smallest object enclosing the touched coordinates would be checked for an entry corresponding to a double-tap action. If no such entry exists, then the next larger object enclosing the touched coordinated would be checked. If for example, this next larger object also exists, and this object includes an entry defining the double tap action as a request to resize the display window such that it becomes aligned with a rectangle with particular coordinates, then the resizing operation can be implemented immediately at the client without assistance from the server. The recommended protocol is to provide a response to the server indicating that the window resize operation has been implemented or is in the process of being implemented. This allows the server to adjust its own model of the client display in order to maintain synchronization. In addition, the details of the response will also inform the server if the proper action was not followed, perhaps due to a software incompatibility, or a hardware limitation. If not preformed, then the appropriate action could be initiated by the server instead, and conveyed to the client in the form of compressed video images. The method may be applied to all forms of touch gestures, as well as sensory input received from accelerometers, gyroscopes, or touch-activated switches. Note that coordinate information might only be applicable to certain touch gestures or sensory inputs and button presses detected after a pointer location has been established by other means. The process allows the meaning of each form of input to be customized and adapted to better suit the current context. An example is provided by the flowchart in FIG. 15.

Figure 15:
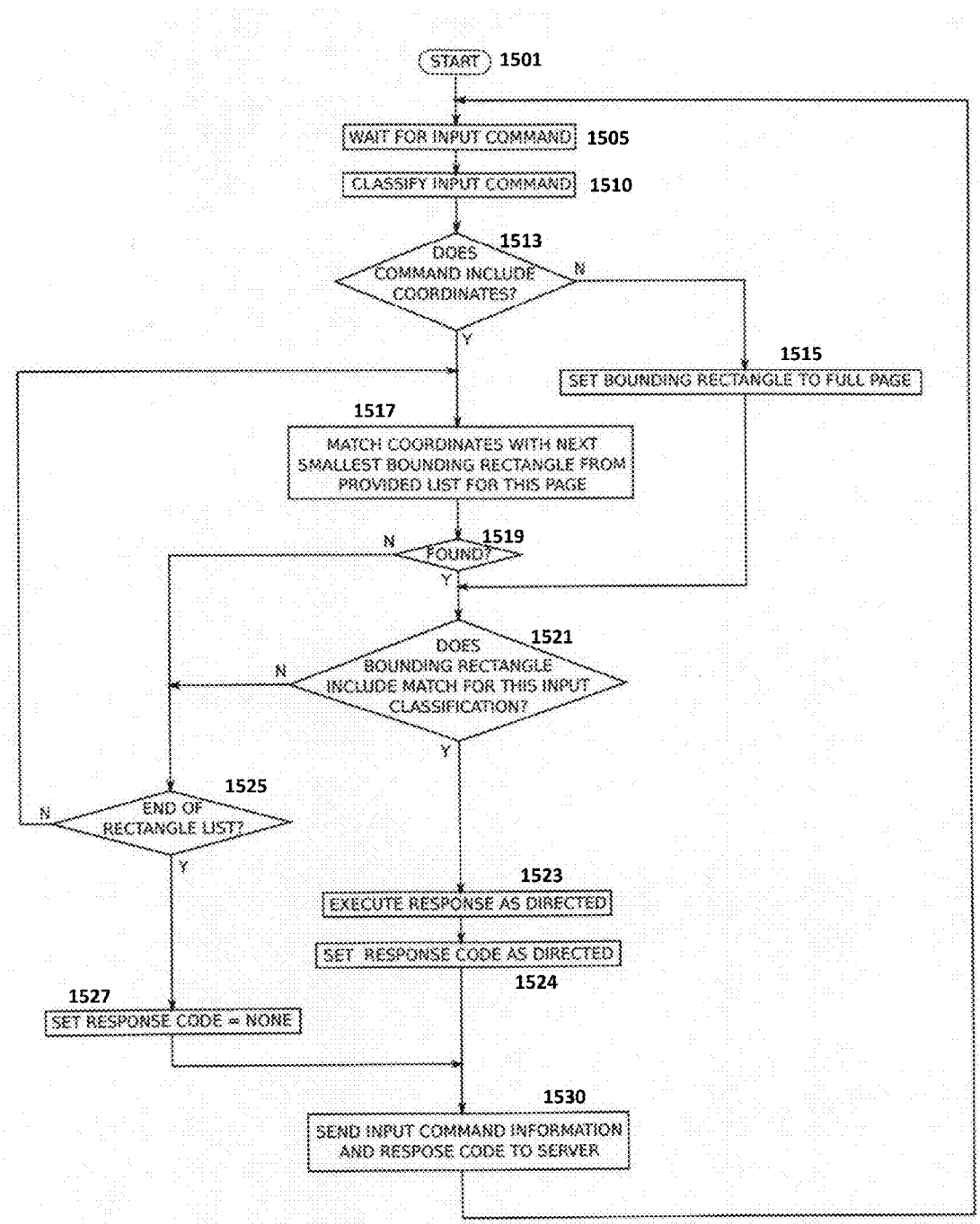
FIG. 15 illustrates an exemplary flowchart for the meaning of each form of input to be customized and adapted to suit a current context according to one embodiment of the present inventions.

FIG. 15 illustrates an exemplary flowchart for the meaning of each form of input to be customized and adapted to suit a current context according to one embodiment. After start 1501 it waits for input command at step 1505 then classifies the input command at step 1510. At step 1513 it is determined whether or not the command includes coordinates. If no, then set bounding rectangle to full page at step 1515. If yes, then at step 1517 match coordinates with next smallest bounding rectangle from provided list for this page. After the matching of step 1517, determine if it is found at step 1519. If yes it is found, then proceed to step 1521 to determine if the bounding rectangle includes a match for this input classification. If yes, then proceed to step 1523 to execute response as directed then step 1524 set a response code as directed. Otherwise if not, then go to step 1525 and decide if end of rectangle list. Also if not found in step 1519 go to step 1525. If end of rectangle list is no, return to step 1517. Otherwise proceed to step 1527 and set response code=none. After steps 1527 and 1524, step 1530 sends the input command information and the response code to the server and flow returns to step 1505.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A method of viewing content, comprising the steps of:
   (a) receiving user client input commands from a client user interface, wherein the user input commands are indicative of at least an off-screen visual sub-region of the content to be displayed;
   (b) using a video decoder in a client including in any order the substeps of
      (b)(1) receiving incremental image updates delivered from an encoder in a server over a network synchronized by the user client input indicative of at least the off-screen visual sub-region of the content to be displayed;

(b)(2) estimating images in memory based on the user client input commands indicative of at least the off-screen visual sub-region of the content to be displayed; and (b)(3) replacing in the memory the images estimated in said step (b)(2) when the incremental image updates arrive over the network in said step (b)(1); and (c) displaying at least a subset of the images in memory representative of at least the off-screen visual sub-region of the content to be displayed based on the user client input commands.

2. A method according to claim 1, wherein the user client input commands are selected from a group consisting of pan commands and zoom commands to interactively display the off-screen visual sub-region of the content.

3. A method according to claim 1, wherein the content includes but is not limited to web browser text.

4. A method according to claim 1,
wherein the content includes but is not limited to text on a web browser;
wherein the user client input commands are selected from a group consisting of pan commands and zoom commands; and
wherein step (a) of receiving user client input commands comprises a substep of commanding navigation of at least the web browser with said user client input commands.

5. A method according to claim 1, wherein the client estimates images in memory and displays a subset of the images in the memory.

6. A method according to claim 1, wherein the client receives, decodes and stores replacement images in memory and displays a subset of the replacement images in the memory.

7. A method according to claim 1, further comprising the step of (d) informing the server of the user client input commands received in said step (a) from the client user interface.

8. A method according to claim 1, wherein the user client input commands are pan commands to interactively pan for the off-screen visual sub-region of the content.

9. A method according to claim 1, wherein the user client input commands are zoom out commands to interactively zoom out to the off-screen visual sub-region of the content.

10. A method of viewing content, comprising the steps of:
(a) receiving user client input commands from a client user interface, wherein the user input commands are indicative of at least a higher resolution visual sub-region of the content to be displayed;
(b) using a video decoder in a client including in any order the substeps of (b)(1) receiving incremental image updates delivered from an encoder in a server over a network synchronized by the user client input indicative of at least the higher resolution visual sub-region of the content to be displayed;

(b)(2) estimating images in memory based on the user client input commands indicative of at least the higher resolution visual sub-region of the content to be displayed; and (b)(3) replacing in the memory the images estimated in said step (b)(2) when the incremental image updates arrive over the network in said step (b)(1); and (c) displaying at least a subset of the images in memory representative of at least the higher resolution visual sub-region of the content to be displayed based on the user client input commands.

11. A method according to claim 10, wherein said step (b)(2) of estimating comprises the substep of (b)(2)(i) interpolating the images in memory based on the user client input commands indicative of at least the higher resolution visual sub-region of the content to be displayed.

12. A method according to claim 10, wherein the user client input commands are zoom commands to interactively display the higher resolution visual sub-region of the content.

13. A method according to claim 12, wherein the user client input commands are zoom in commands to interactively zoom in to the higher resolution visual sub-region of the content.

14. A method according to claim 10, wherein the content includes but is not limited to web browser text.

15. A method according to claim 10,
wherein the content includes but is not limited to text on a web browser;
wherein the user client input commands are zoom commands; and
wherein step (a) of receiving user client input commands comprises a substep of commanding navigation of at least the web browser with said user client input commands.

16. A method according to claim 10, wherein the client estimates images in memory and displays a subset of the images in the memory.

17. A method according to claim 10, wherein the client receives, decodes and stores replacement images in memory and displays a subset of the replacement images in the memory.

18. A method according to claim 10, further comprising the step of (d) informing the server of the user client input commands received in said step (a) from the client user interface.

* * * * *